United States Patent
Zhong et al.

(10) Patent No.: US 9,748,728 B2
(45) Date of Patent: Aug. 29, 2017

(54) OPTICAL PARAMETRIC OSCILLATION LASER BASED ON I-TYPE QUASI-PHASE MATCHING

(71) Applicant: SHENZHEN UNIVERSITY, Shenzhen (CN)

(72) Inventors: Haizhe Zhong, Shenzhen (CN); Ying Li, Shenzhen (CN); Lifu Zhang, Shenzhen (CN); Shuangchun Wen, Shenzhen (CN); Dianyuan Fan, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 15/124,604

(22) PCT Filed: Jun. 15, 2015

(86) PCT No.: PCT/CN2015/081433
§ 371 (c)(1),
(2) Date: Sep. 8, 2016

(87) PCT Pub. No.: WO2016/065905
PCT Pub. Date: May 6, 2016

(65) Prior Publication Data
US 2017/0018904 A1    Jan. 19, 2017

(30) Foreign Application Priority Data
Oct. 29, 2014    (CN) .......................... 2014 1 0590683

(51) Int. Cl.
*H01S 3/10*    (2006.01)
*H01S 3/04*    (2006.01)
(Continued)

(52) U.S. Cl.
CPC .............. *H01S 3/1083* (2013.01); *G02F 1/39* (2013.01); *H01S 3/094076* (2013.01);
(Continued)

(58) Field of Classification Search
CPC .... H01S 3/1083; H01S 3/1671; H01S 3/1601; H01S 3/1317; H01S 3/094076;
(Continued)

(56) References Cited

U.S. PATENT DOCUMENTS 5,606,453 A * 2/1997 Walling .................... G02F 1/39
                                                               359/256
7,339,718 B1 * 3/2008 Vodopyanov ............. G02F 1/39
                                                               359/326

(Continued)

FOREIGN PATENT DOCUMENTS

CN    102064462 A    5/2011
CN    104064947 A    9/2014
(Continued)

OTHER PUBLICATIONS

Yu et al. "Broadband quasi-phase-matching second-harmonic generation in MgO-doped periodically poled LiNbO3 at the communications band," Optics Letters, vol. 27, No. 12, Jun. 15, 2002.*

(Continued)

*Primary Examiner* — Yuanda Zhang
(74) *Attorney, Agent, or Firm* — Anova Law Group, PLLC

(57) ABSTRACT

Provided is an optical parametric oscillation laser based on I-type quasi-phase matching. The optical parametric oscillation laser comprises a femtosecond laser pumping source (1), an input coupling mirror (3), an Mg:PPLN crystal (4), an output coupling mirror (7) and a beam splitter prism (12), wherein the femtosecond laser pumping source (1) of a synchronous pump, the input coupling mirror (3), the Mg:P-
(Continued)

PLN crystal (4), the output coupling mirror (7) and the beam splitter prism (12) are sequentially placed. Group velocity mismatching between near-infrared pump light and intermediate infrared signal light in the intermediate infrared optical parametric oscillation laser is eliminated by using the dispersion relationship between the crystal and the temperature and in a manner of adjusting the working temperature of the crystal, so that an optical parametric oscillation process can satisfy phase matching and group velocity matching at the same time, and therefore intermediate infrared ultrashort pulse laser with high power and wide spectrum is obtained.

5 Claims, 1 Drawing Sheet

(51) Int. Cl.
| | |
|---|---|
| *H01S 3/108* | (2006.01) |
| *H01S 3/094* | (2006.01) |
| *H01S 3/131* | (2006.01) |
| *H01S 3/16* | (2006.01) |
| *G02F 1/39* | (2006.01) |
| *H01S 3/00* | (2006.01) |
| *G02F 1/35* | (2006.01) |

(52) U.S. Cl.
CPC .......... *H01S 3/1317* (2013.01); *H01S 3/1601* (2013.01); *H01S 3/1671* (2013.01); *G02F 2001/3503* (2013.01); *G02F 2001/3542* (2013.01); *G02F 2001/3548* (2013.01); *G02F 2203/15* (2013.01); *H01S 3/0092* (2013.01)

(58) Field of Classification Search
CPC . H01S 3/0092; G02F 1/39; G02F 1/35; G02F 2203/15; G02F 2001/3503; G02F 2001/3542; G02F 2001/3548
See application file for complete search history.

(56) References Cited

U.S. PATENT DOCUMENTS

| | | | |
|---|---|---|---|
| 2007/0035810 A1* | 2/2007 | Henderson | H01S 3/0675 359/330 |
| 2013/0313440 A1* | 11/2013 | Chuang | G01N 21/956 250/372 |
| 2014/0016168 A1* | 1/2014 | Marandi | G06E 1/00 359/107 |

FOREIGN PATENT DOCUMENTS

| | | |
|---|---|---|
| CN | 104300354 A | 1/2015 |
| WO | 0072086 A1 | 11/2000 |

OTHER PUBLICATIONS

The World Intellectual Property Organization (WIPO) International Search Report for PCT/CN2015/081433 Sep. 18, 2015 pp. 1-6.
Tan, Gaijuan et al.: "Recent progress in mid-infrared laser technology", Chinese Optics, vol. 6, No. 4, Aug. 31, 2013 (Aug. 31, 2013), pp. 504 and 505.
Liu, Tong: "Research of Fiber Laser Pumped Picosecond Optical Parametric Oscillators", China Master's Theses Full-Text Database, Volume of Information Science and Technology, Jul. 15, 2012 (Jul. 15, 2012) chapter 3, sections 3.1-3.3.

* cited by examiner

OPTICAL PARAMETRIC OSCILLATION LASER BASED ON I-TYPE QUASI-PHASE MATCHING

CROSS-REFERENCES TO RELATED APPLICATIONS

This application is a national stage application of PCT Patent Application No. PCT/CN2015/081433, filed on Jun. 15, 2015, which claims priority to Chinese Patent Application No. 2014105906830, filed on Oct. 29, 2014, the content of all of which is incorporated herein by reference.

FIELD OF THE INVENTION

The present invention relates to the field of laser technologies, and more particularly, to an optical parametric oscillation laser based on I-type quasi-phase matching.

BACKGROUND

A synchronously pumped optical parametric oscillation laser (OPO) owns a plurality of advantages including a wide tuning range, a compact structure and more, it may also generate a high power ultrashort pulse laser at a high repetition rate (100 MHz). A mid-infrared femtosecond OPO using a near-infrared femtosecond laser as a pumping source is a more practical method to obtain a mid-infrared ultrashort pulse, especially to obtain a mid-infrared optical frequency comb in current technologies.

However, a technical problem hampering a further development of the said mid-infrared femtosecond OPO is how to eliminate group velocity mismatching (GVM) between a plurality of interacting pump waves, signal waves and idler waves during the optical parametric oscillation process, and a plurality of consequent problems include a limited conversion efficiency and a narrowing gain bandwidth. A plurality of detrimental impacts caused by the GVM are mainly reflected in two aspects: in time domain, the pump wave and the signal wave would walk away from each other during the oscillation process, which limits the final conversion efficiency in direct; in spectrum domain, the existing of GVM may decrease the gain bandwidth of OPO, and thus extend a pulse duration, which is extremely unfavorable in obtaining the mid-infrared femtosecond laser with an ultrashort pulse duration.

In order to eliminate the detrimental impacts on optical parametric process caused by GVM, there is a plurality of existing solutions, including mainly: employing a non-collinear phase matching configuration, inserting a dispersion-managed device (such as a chirped mirror), letting the OPO operate at nearly degeneracy and else. However, dispersion-managed device s can not solve the problem of gain bandwidth narrowing caused by GVM; adopting the non-collinear phase matching method, may significantly improve the phase matching bandwidth of optical parametric process, however, it may also bring in hardly offset angular dispersion to the output laser, which is not beneficial for any subsequent usages; letting the OPO system operate at nearly degeneracy is able to make the signal wave and idler wave satisfy group velocity matching intrinsically, however, subject to a limited number of pump sources, only a few laser wavelengths can be obtained via this specific mode. Additionally, an aperiodically poled lithium niobate (APPLN) crystal with a chirped grating profile is proposed. All of the signal wavelength components of interest can satisfy phase matching condition in certain areas of the crystal, ascribed to the changing grating periods along the propagation direction. However, this specific method has equivalently shortened effective length of the nonlinear crystal, and also brought in a plurality of difficulties to both designing and machining of the crystal.

Therefore, the prior art needs to be further improved and developed.

BRIEF SUMMARY OF THE DISCLOSURE

According to above mentioned defects in the prior arts, the purpose of the present invention is providing users an optical parametric oscillation laser (OPO) based on I-type quasi-phase matching (QPM), which is able to adjust group velocity relationship between a signal wave, an idler wave and a pump wave, and is even able to eliminate group velocity mismatching within the optical parametric oscillation process. The present invention has impressive ability to optimize a conversion efficiency, spectrum bandwidth or threshold for OPO systems, via precise temperature manipulation of the nonlinear crystal and the subsequent regulation for the group velocity relationship between the signal, idler and pump waves.

In order to achieve the above said purposes, the following technology protocols are adopted in the present invention:

An optical parametric oscillation laser based on I-type quasi-phase matching, wherein, it comprises:
 a femtosecond pulse laser serving as a pump source;
 an input coupling mirror;
 a periodically poled MgO doped LiNbO3 (MgO:PPLN) crystal;
 an output coupling mirror; and, a beam splitter prism;
 wherein, the femtosecond pulse laser serving as a pump source, the input coupling mirror, the MgO:PPLN crystal, the output coupling mirror and the beam splitter prism are placed sequentially;
 a laser pulse emitted from the femtosecond pulse laser serving as a pump source, enters the MgO:PPLN crystal through the input coupling mirror, and forms optical parametric oscillation between the input coupling mirror and the output coupling mirror; a mixed light is then emitted from the output coupling mirror, which is further isolated by the beam splitter prism, and a mid-infrared ultrashort pulse laser is finally obtained.

The optical parametric oscillation laser based on I-type quasi-phase matching, wherein, the MgO:PPLN crystal is the one satisfying type I QPM.

The optical parametric oscillation laser based on I-type quasi-phase matching, wherein, a temperature-control oven applied to regulating the operation temperature of the MgO:PPLN crystal is arranged under the MgO:PPLN crystal.

The optical parametric oscillation laser based on I-type quasi-phase matching, wherein, the operation temperature of the temperature-control oven is 20-220□.

The optical parametric oscillation laser based on I-type quasi-phase matching, wherein, the mixed light includes a signal wave, an idler wave and a residual pump wave.

The optical parametric oscillation laser based on I-type quasi-phase matching, wherein, a dispersion compensation device is arranged between the MgO:PPLN crystal and the output coupling mirror, applied to eliminating the influence of group velocity dispersion.

The optical parametric oscillation laser based on I-type quasi-phase matching, wherein, the femtosecond pulse laser serving as a pump source is operating at near-infrared wavelengths between 0.78 µm and 1.6 µm.

An optical parametric oscillation laser based on I-type quasi-phase matching, as provided in the present invention, includes: a femtosecond pulse laser serving as a pump source, an input coupling mirror, an MgO:PPLN crystal, an output coupling mirror and a beam splitter prism; wherein, the femtosecond pulse laser serving as a pump source, the input coupling mirror, the MgO:PPLN crystal, the output coupling mirror and the beam splitter prism are placed sequentially; the laser pulse emitted from the said femtosecond pulse laser enters the MgO:PPLN crystal after passing through the said input coupling mirror, and forms optical parametric oscillation between the said input coupling mirror and the said output coupling mirror. The said mixed light emitted from the said output coupling mirror is further isolated by the said beam splitter prism, before the mid-infrared ultrashort pulse laser is obtained. Group velocity mismatching between the near-infrared pump wave and mid-infrared signal wave in mid-infrared OPO is eliminated in a manner of adjusting the operating temperature of the crystal, in terms of its intrinsic temperature-depended group velocity characteristics. Via an appropriate design for both crystal temperature and grating period, group velocity matching can be satisfied in company with phase matching, and therefore a mid-infrared ultrashort pulse laser with high power and broad spectrum is obtained.

DETAILED DESCRIPTION OF EMBODIMENTS

In order to make the purpose, technical solution and the advantages of the present invention clearer and more explicit, further detailed descriptions of the present invention are stated here, referencing to the attached drawings and some embodiments of the present invention. It should be understood that the detailed embodiments of the invention described here are used to explain the present invention only, instead of limiting the present invention.

Figure 1:
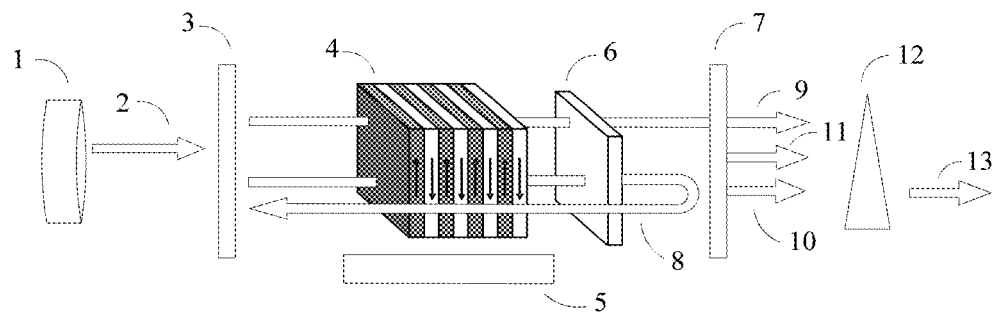
FIG. 1 illustrates a schematic diagram of an optical parametric oscillation laser based on type I quasi-phase matching as described in the present invention and the optical path thereof.

Referencing to FIG. 1, which is a schematic diagram of an optical parametric oscillation laser (OPO) based on type I quasi-phase matching (QPM) as described in the present invention and the optical path thereof. As shown in FIG. 1, the said OPO based on type I QPM, includes: a femtosecond pulse laser serving as a pump source 1, an input coupling mirror 3, an MgO:PPLN crystal 4, an output coupling mirror 7 and a beam splitter prism 12; wherein, the said femtosecond pulse laser serving as a pump source 1, the input coupling mirror 3, the MgO:PPLN crystal 4, the output coupling mirror 7 and the beam splitter prism 12 are placed sequentially.

Specifically, the synchronously pumped OPO is designed with a basic linear cavity and singly resonant for the 3.2 μm mid-IR wavelength, which mainly includes a femtosecond pulse laser serving as a pump source, a nonlinear crystal and an optical resonance cavity. Wherein, an 800 nm Ti:sapphire femtosecond pulse laser is adopted as the femtosecond pulse laser serving as a pump source 1; and an MgO:PPLN crystal 4 satisfying type I QPM is taken as the nonlinear crystal. The resonance cavity is composed by the input coupling mirror 3 and the output coupling mirror 7, wherein, the input coupling mirror 3 is highly transparent to a pump wave at 800 nm and highly reflective to a signal wave at 3.2 μm; while the output coupling mirror 7 is highly transparent to both the residual pump wave at 800 nm and the by produced idler wave at 1.06 μm, but partially transparent to the 3.2 μm signal wave.

In this case, an 800 nm near-infrared pulse laser 2 emitted from the said femtosecond pulse laser serving as a pump source 1 enters the MgO:PPLN crystal 4 after passing through the said input coupling mirror 3, and forms optical parametric oscillation 8 between the said input coupling mirror 3 and the said output coupling mirror 7 in the optical resonance cavity. Finally, in order to separate the 3.2 μm signal wave 10 from the 1.06 μm idler wave 9 and the residual 800 nm pump wave 11, all of them pass through the beam splitter prism 12, and a 3.2 μm mid-infrared ultrashort pulse laser 13 is finally obtained after filtering out those unwanted stray lights.

Preferably, the said MgO:PPLN crystal satisfies type I QPM condition. In order to make use of a maximum nonlinear coefficient (d33) of the nonlinear crystal, a periodically poled crystal is usually required to meet a type-0 QPM condition (e+e→e). However, this also brings in remarkable group velocity mismatching (GVM) to the synchronously pumped OPO. Since the refractive index of a nonlinear crystal may vary versus the temperature, therefore, for a laser pulse propagating inside the crystal, the group velocity v thereof should also be temperature dependent. However, for two laser beams having a same polarization, the group velocity differences can not be eliminated by simply changing the operation temperature of the nonlinear crystal. Thus, different to a conventional mid-infrared femtosecond OPO system, the present invention adopts a QPM technology meeting the type I phase matching condition (o+o→e), wherein, the signal waves and the pump waves are propagating in the periodic poled crystal with orthogonal polarizations (wherein, the signal wave are o-polarized while the pump waves are e-polarized) (as shown in FIG. 1). In terms of its intrinsic temperature-depended group velocity characteristics, via precise manipulation of the operation temperature, group velocity mismatch between the near-IR pump wave and the mid-IR signal wave can be completely eliminated at a certain temperature (GVM=0). And then an appropriate grating period is designed according to the chosen temperature, making sure that both QPM and group velocity matching between the signal waves and pump waves can be satisfied simultaneously for OPO, and obtaining a mid-infrared ultrashort pulse laser 13 at a wavelength between 1.05 μm and 6 μm. What is more, a dispersion compensation device 6 (e.g. germanium) may also be inserted into the resonance cavity, applied to compensating the dispersion of the mid-infrared signal wave accumulated within a parametric process, in order to increase the peak power and conversion efficiency of OPO.

Preferably, as shown in FIG. 1, below the said MgO:PPLN crystal 4, a temperature-control oven 5 is arranged to regulate the operation temperature of the said MgO:PPLN crystal 4.

Figure 2:
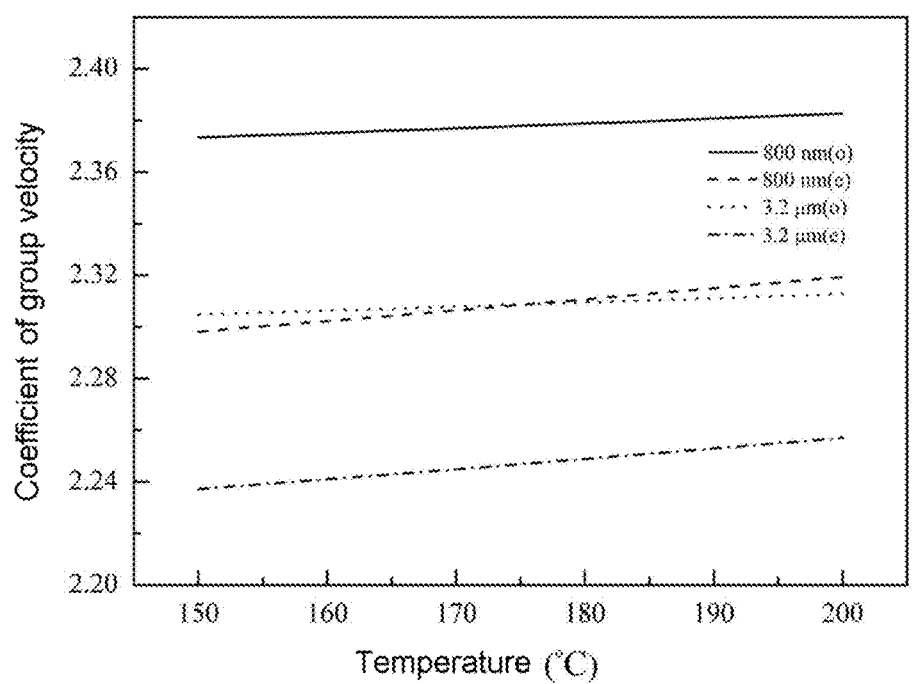
FIG. 2 illustrates the curves of temperature-depended group velocity coefficients for both the 800 nm near-infrared pump wavelength and the 3.2 μm mid-infrared signal wavelength in the MgO:PPLN, as described in the present invention.

It may make the signal wave in a range of 1.05-3.5 μm meet the group velocity matching with a pump wave from Ti:sapphire at 800 nm via a precise temperature manipulation of the MgO:PPLN crystal in a temperature range of 20-220° C. As shown in FIG. 2, it illustrates the curves of temperature-depended group velocity coefficients for both the 800 nm near-infrared pump wavelength and the 3.2 µm mid-infrared signal wavelength in the MgO:PPLN From the figure, It can be seen that, when two laser beams have the same polarization, remarkable group velocity difference does exist, which may not be eliminated by simply changing the temperature of the MgO:PPLN crystal 4. However, when these two laser beams propagate in the MgO:PPLN crystal 4 with orthogonal polarizations (wherein, the signal wave is o-polarized while the pump wave is e-polarized), under a specific temperature of 175° C., their group velocities may be equal, i.e., GVM=0. It should be noted that, under such an operation temperature, a grating period of 62.8 µm is required to satisfy the QPM condition.

In specific implementations, the said femtosecond laser serving as a pumping source 1 is not limited to an 800 nm Ti:sapphire femtosecond laser, it may also be other types of femtosecond laser with a wavelength between 0.78 µm and 1.6 µm, and outputting a mid-infrared pulse laser with a wavelength between 1.05 µm and 6 µm.

All above, the present invention provides an OPO based on type I QPM, comprising: a femtosecond pulse laser serving as a synchronous pump source, an input coupling mirror, an MgO:PPLN crystal, an output coupling mirror and a beam splitter prism, wherein the said femtosecond pulse laser serving as a synchronous pump source, the input coupling mirror, the MgO:PPLN crystal, the output coupling mirror and the beam splitter prism are placed sequentially; a laser pulse emitted from the femtosecond pulse laser serving as a synchronous pump source, enters the MgO:PPLN crystal through the said input coupling mirror, and forms optical parametric oscillation between the said input coupling mirror and the said output coupling mirror. The said mixed light which emits from the said output coupling mirror is further isolated by the said beam splitter prism, and a mid-infrared ultrashort pulse laser is then obtained. In the described present invention, group velocity mismatching between the near-infrared pump wave and the mid-infrared signal wave in mid-infrared optical parametric oscillator is eliminated in terms of the intrinsic temperature-depended group velocity characteristics of the crystal. Group velocity matching can be satisfied in company with phase matching, and therefore the mid-infrared ultrashort pulse laser with high power and broad spectrum is obtained.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. An optical parametric oscillation laser based on I-type quasi-phase matching, comprising:
    a femtosecond pulse laser serving as a pump source;
    an input coupling mirror;
    an MgO:PPLN crystal;
    an output coupling mirror; and,
    a beam splitter prism;
    wherein, the femtosecond pulse laser, the input coupling mirror, the MgO:PPLN crystal, the output coupling mirror and the beam splitter prism are placed sequentially;
    a pump light emitted from the femtosecond pulse laser, enters the MgO:PPLN crystal through the input coupling mirror, and forms optical parametric oscillation between the input coupling mirror and the output coupling mirror; a mixed light is then emitted from the output coupling mirror, which is further isolated by the beam splitter prism, and a mid-infrared ultrashort pulse laser is finally obtained, the mixed light includes a signal light, an idler light and a residual pump light; and
    a temperature-control oven arranged under the MgO:PPLN crystal is applied to regulating the operation temperature of the MgO:PPLN crystal, the signal light and the pump light are propagating in the MgO:PPLN crystal with orthogonal polarizations, and a group velocity mismatch between the signal light and the pump light is eliminated at a regulated operation temperature.

2. The optical parametric oscillation laser based on I-type quasi-phase matching according to claim 1, wherein, the MgO:PPLN crystal is an MgO:PPLN crystal satisfying type I quasi-phase matching.

3. The optical parametric oscillation laser based on I-type quasi-phase matching according to claim 1, wherein, the operation temperature of the temperature-control oven is 20-220° C.

4. The optical parametric oscillation laser based on I-type quasi-phase matching according to claim 1, wherein, a dispersion compensation device is arranged between the MgO:PPLN crystal and the output coupling mirror, applied to eliminating the influence of group velocity dispersion.

5. The optical parametric oscillation laser based on I-type quasi-phase matching according to claim 1, wherein, the femtosecond pulse laser is operating at near-infrared wavelengths between 0.78 µm and 1.6 µm.

* * * * *